US012800866B2

(12) United States Patent
Persson

(10) Patent No.: US 12,800,866 B2
(45) Date of Patent: Nov. 17, 2026

(54) LENS HOLDER, A SENSOR UNIT, AND AN IMAGE CAPTURING DEVICE

(71) Applicant: Axis AB, Lund (SE)

(72) Inventor: Henrik Persson, Lund (SE)

(73) Assignee: AXIS AB, Lund (SE)

( * ) Notice: Subject to any disclaimer, the term of this patent is extended or adjusted under 35 U.S.C. 154(b) by 34 days.

(21) Appl. No.: 18/980,333

(22) Filed: Dec. 13, 2024

(65) Prior Publication Data

US 2025/0208367 A1 Jun. 26, 2025

(30) Foreign Application Priority Data

Dec. 20, 2023 (EP) .................................... 23218781

(51) Int. Cl.
*G02B 7/02* (2021.01)
*H04N 23/55* (2023.01)

(52) U.S. Cl.
CPC ............... *G02B 7/02* (2013.01); *H04N 23/55* (2023.01)

(58) Field of Classification Search
CPC .......... G02B 7/008; G02B 7/02; G02B 7/028; H04N 23/54; H04N 23/55
See application file for complete search history.

(56) References Cited

U.S. PATENT DOCUMENTS 6,560,045 B1 5/2003 Schletterer
9,838,579 B2 * 12/2017 Reiche .................. H04N 23/57
10,645,795 B2 5/2020 Byrne et al.
10,899,275 B2 1/2021 Lu et al.
10,911,647 B2 2/2021 Byrne et al.
11,353,678 B2 * 6/2022 Imai ......................... G02B 7/02
2008/0278833 A1 11/2008 Yuan
2020/0154020 A1 * 5/2020 Byrne ..................... B60R 11/04
2021/0191064 A1 * 6/2021 Imai ......................... G02B 7/02
2023/0232091 A1 7/2023 Nishioka

OTHER PUBLICATIONS

Extended European Search Report, European Patent Application No. 23218781.5, dated Jun. 14, 2024.

* cited by examiner

*Primary Examiner* — Amy R Hsu

(74) *Attorney, Agent, or Firm* — Volpe Koenig

(57) ABSTRACT

A lens holder for an optics unit of an image capturing device, the lens holder having a body extending in a lens holder plane and comprising: a lens mount arranged on the body configured to support a lens of the optics unit and extending along a longitudinal axis perpendicular to the lens holder plane; and support posts extending from the body of the lens holder along the longitudinal axis and supports a sensor unit aligned with the optics unit, wherein each support post has a first end adjoining the body of the lens holder, and a free second end, and wherein the first end of one or more support posts adjoins a respective displacement portion of the body of the lens holder, which displacement portion is configured to be displaced out of the lens holder plane in response to a thermally induced force acting on the support post.

14 Claims, 5 Drawing Sheets

LENS HOLDER, A SENSOR UNIT, AND AN IMAGE CAPTURING DEVICE

FIELD OF THE INVENTION

The present disclosure relates to a lens holder for an optics unit of an image capturing device, a sensor unit for an image capturing device, and an image capturing device comprising said lens holder or said sensor unit.

BACKGROUND ART

Image capturing devices face challenges posed by focal shift due to thermal expansion of materials within the device. In particular, when components of materials with different Coefficients of Linear Thermal Expansion (CLTEs) are assembled, the materials will bend due to a changing temperature. Thermal expansion may, for example, arise due to temperature changes in an environment of the image capturing device.

Image capturing devices are commonly used in various applications, including surveillance systems and automotive camera systems. These devices rely on optics units comprising lenses that have to maintain precise alignment with respect to an image sensor position to capture clear and accurate images. However, materials used in the construction of lens holders and other components of the optics unit can undergo thermal expansion or contraction in response to temperature fluctuations. This can lead to focal shift, where a distance between the one or more lenses and the image sensor of the optics unit changes, consequently changing a focus of the lens, and potentially resulting in blurred or distorted images.

Focal shift due to thermal expansion is particularly problematic in environments with significant temperature variations. For example, surveillance cameras located in an outdoor environment may be exposed to changing temperatures of seasons and day and night cycles, while cameras in vehicles must operate reliably across a wide range of weather conditions.

There is a need for stable and reliable image capturing devices with consistent performance, especially in applications where safety, security, and sharp images are in demand. Therefore, there is a need for a lens holder that can minimize the effects of thermal expansion and maintain the focus of the lens despite temperature changes.

US 2020/154020 A1 discloses a vehicular camera that includes a lens holder having a lens barrel accommodating a lens, a circuit board, and an imager disposed at a first side of a circuit board substrate. The circuit board substrate is attached at support posts extending from the support structure, with the support posts configured to flex in a radial direction toward or away from the longitudinal axis of the lens barrel.

SUMMARY OF THE INVENTION

It is an object of the present disclosure to provide a lens holder for compensation of thermal expansions and contractions.

It is another object to provide a sensor unit for an image capturing device for compensation of thermal expansions and contractions.

A further object is to provide an image capturing device with decreased focal shift due of temperature changes.

To achieve at least one of the above objects and also other objects that will be evident from the following description, a lens holder having the features defined in claim 1 is provided according to the present invention. Preferred embodiments will be evident from the dependent claims.

More specifically, there is provided according to a first aspect of the present invention a lens holder for an optics unit of an image capturing device. The lens holder has a body extending in a lens holder plane and comprises: a lens mount arranged on the body configured to support a lens of the optics unit and extending along a longitudinal axis perpendicular to the lens holder plane; and support posts extending from the body of the lens holder along the longitudinal axis and configured to support a sensor unit aligned with the optics unit. Each support post has a first end adjoining the body of the lens holder, and a free second end. The first end of one or more support posts adjoins a respective displacement portion of the body of the lens holder, which displacement portion is configured to be displaced out of the lens holder plane in response to a thermally induced force acting on the support post.

The lens holder may be injection molded in one piece, e.g. to ensure structural integrity and/or uniformity of material properties. The injection molding may allow for the creation of certain profiles, which may include intricate features such as the displacement portions and/or the support posts. The lens holder may be formed as one continuous piece, with the displacement portions and/or supports posts being shaped during the injection molding. Hence, no assembly of multiple parts is necessary, thereby reducing potential alignment issues and also allowing efficient space utilization since no additional or separate parts need to be added to form the lens holder. The lens holder may thus also allow for a simplified manufacturing process, e.g. leading to cost-effective production.

The injection molding may be performed with various materials, including metals and polymers.

The respective displacement portions may be flexible connection portions. The displacement portions may refer to portions configured to undergo movement from an original position, e.g. due to a force induced by thermal expansion. The displacement may be linear (e.g. involving a shift in position) and/or angular (e.g. involving a rotation).

The displacement portions may be designed elements within the lens holder that allow for movement or flexibility to absorb and/or compensate for displacements of the lens holder and/or sensor unit in relation to each other. In other word, the displacement portions may be areas that experience movement, and/or be adaptive elements that manage or control a movement within a system. Essentially, the displacement portions may be configured to move under specific operational conditions.

Each support post may be a pin or a coupling part. The support posts may, e.g., be coupling parts configured to couple, and/or fixedly attach, the lens holder to a sensor unit.

The thermally induced force may be a stress exerted on a material or structure due to changes in temperature, which results in thermal expansion or contraction. A temperature increase may cause the material to expand, while a decrease in temperature may lead to contraction of the material. This behavior may be quantified by the coefficient of linear thermal expansion (CLTE), and/or the coefficient of thermal expansion (CTE), of the material. In a constrained environment, where the material is attached to a rigid body or another material with a different CLTE, the thermal changes can induce stress.

CLTE and CTE are two measures of how a material responds to temperature changes. CLTE is specific to linear expansion, while CTE can refer to linear, areal, or volumetric expansion. If the CLTE value of a material is known, the CTE can be calculated, and vice versa, provided that the type of expansion (linear, areal, or volumetric) the CTE value refers to is known.

Hence, when the lens holder is coupled to a sensor unit, the lens holder provides compensation for thermal expansion. The lens holder may thus be kept in place or experience only minor displacements. Thus, a substantially constant distance between the lens holder and sensor unit may be maintained regardless of temperature variations.

The lens holder may provide adjustable compensation by adjusting a size of the displacement portions and/or by adjusting a size of the support posts when designing the lens holder for a particular implementation or use case. In particular, the lens holder possesses the ability to overcompensate if required for specific applications or purposes.

The lens holder may compensate for thermal expansion in all three spatial dimensions. In particular, the support posts may be designed to flex radially towards or away from the lens mount and/or longitudinal axis, facilitating a movement in the lens holder plane. Meanwhile, the displacement portions are configured to be displaced out of the lens holder plane.

Thereby, the lens holder may maintain precise alignment and functionality, ensuring that an image capturing device comprising the lens holder remains unaffected by temperature-induced changes, resulting in enhanced image reliability.

Each displacement portion is defined by one or more slits.

The displacement portions may be any suitable flexible connection portions. The displacement portions may, e.g., be flexible ribs located on the lens holder.

The one or more slits may be long narrow cuts or openings that are created or formed in the lens holder. The one or more slits may be configured to influence a behavior of the lens holder during thermal expansion of the lens holder material and/or a component coupled to the lens holder.

The displacement portions may be characterized by the one or more slits. The slit, or slits, defining each displacement portion may impart a flexibility or movability of each displacement portion, allowing it to adapt in response to a thermal expansion.

The one or more slits may be arranged such that they permit the displacement portion to bend, flex, stretch, rotate, and/or move in response to thermal expansion. In an example, a displacement portion may be defined by two parallel slits, e.g. forming a rib on which a support post may be arrange.

The placement, orientation, and/or geometric characteristics of one or more slits may be tailored to facilitate a desired movement. Hence, the displacement portions may accommodate necessary adjustments or alterations to keep the lens holder in a substantially constant position, e.g. in relation to a sensor unit during deformation due to a thermally induced force.

Each displacement portion may be defined by a single slit forming a tongue.

The tongue may be defined as an elongated flexible member or a tab or rib. The tongue may be integrally formed with the lens holder. In particular, the tongue may be a movable element that remains attached to the lens holder at one end, while the opposite end may be free to move in response to a thermally induced force.

The single slit may outline the boundaries of the tongue, e.g. forming a U-shaped slit.

The tongue may bend, flex, stretch, pivot, rotate, and/or move, e.g. in response to a thermally induced force acting on the support post adjoining the displacement portion defined by the single slit. Hence, the tongue may provide a flexibility to the displacement portion and, consequently, to the lens holder.

The tongues may have a linear extension. In other words, the tongues may be straight tongues within the lens holder plane. Alternatively, the tongues may be curved or arced.

Hence, a movement of each tongue may be predictably controlled. Thereby, providing an ability of the displacement portions and/or the lens holder to move in a specific predetermined manner.

The tongues may comprise at least two or more tongues extending along a respective extension axis, and wherein the extension axes, at a common intersection point, intersects a central axis of a region defined by the periphery portion of the lens mount.

In other words, two or more tongues may extend along a respective extension axis intersecting a central axis of the lens holder. In particular, the extension axes of the two or more tongues may have a common intersection point on the central axis. The tongues may, e.g., extend radially inwards from a periphery portion of the lens holder.

The common intersection point may be within the region defined by the periphery portion defined by the lens mount. Alternatively, the common intersection point may be anywhere on the central axis of the lens holder, e.g., within the body of the lens holder.

The central axis may be a central axis in the lens holder plane. The central axis may, e.g., be a symmetry axis of the lens holder. In particular, the central axis may intersect the longitudinal axis of the lens holder. The central axis may, e.g., be orthogonal to the longitudinal axis.

In an example, the extension axes of the tongues may intersect pairwise along the central axis. In particular, the extension axes of a first pair of tongues may form a first intersection point on the central axis, and the extension axes of a second pair of tongues may form a second intersection point on the central axis, and so on.

On the central axis, an extension axis of a first tongue arranged on a first side of the central axis, may intersect with an extension axis of a second tongue arranged on a second side of the central axis. More specifically, each pair of tongues may constitute two tongues symmetrically arranged, or mirrored, around the central axis of the lens holder.

A common intersection point may form a point on the central axis serving as a leverage point, where a resultant force may act, resulting in a lifting or lowering effect of the lens holder when attached to, e.g., a sensor unit. In other words, the common intersection point may be a pivotal point. As the tongues are displaced, the pivotal point may act as a central focus of a lifting or lowering of the lens holder. Hence, the common intersection point may be a point where the extension axes of the tongues converges to exert a force.

The first and second intersection points on the central axis may hence act as two pivotal points, thus providing a distributed and/or uniform lifting or lowering of the lens holder. The first and second intersection points may be equidistant from a center of the lens holder.

If the support posts are symmetrically positioned around the center of the lens holder, the thermally induced forces may act radially from the center of the lens holder and the lens holder will move up or down along the longitudinal axis. Thereby providing controlled movement of the lens holder when being attached to, e.g., a sensor unit, and being subject to a thermal expansion and/or contraction.

Each support post may be integrally formed with the body of the lens holder. In other words, the support posts may be formed during injection molding of the lens holder. In particular, each support post may be integrally formed with a displacement portion.

The support posts may protrude or extend from the body of the lens holder such that one or more support posts may have a length in a range of 1-10 mm.

In an example, one or more support posts are arranged on a tip of a respective tongue. In other words, the support post may be arranged at an end of the corresponding displacement portion. However, a support post may be arranged at any suitable location of a displacement portion. A support post may, e.g. be arranged in a middle portion of one or more displacement portions.

The support posts may be distributed along a periphery portion of the lens mount. In other words, the support posts may be arranged in a vicinity of the lens mount, and/or spaced apart around the lens mount. The support posts may be spaced circumferentially around the lens mount and/or around the longitudinal axis of the lens holder.

The support posts may be a plurality of support posts. The lens holder may comprise at least two support posts placed at opposite portions of the lens holder, e.g. on opposite sides of the central axis. The lens holder may preferably comprise four support posts to provide a balanced support against a sensor unit.

The support posts may be arranged around the longitudinal axis of the lens holder. The support posts may be separate and/or inward from a periphery portion of the lens holder. Two or more support posts may be equidistant from a center of the lens holder, e.g. equidistant from the longitudinal axis.

The support posts may form opposed pairs. Each pair of support posts may be symmetrically positioned with respect to the central axis of the lens holder. The support posts of one pair may be arranged closer to each other than to the support posts of another pair, or vice versa. Such a distribution of the support posts may facilitate balanced support and thermal accommodation within the lens holder.

The lens holder may be formed of a polymer material.

Polymer materials may be easily molded or injection molded, allowing for various shapes, designs, and features to be implemented.

Polymer materials may be lightweight, thus contributing to a reduction of a total weight of an image capturing device comprising the lens holder.

Furthermore, polymer materials may be treated with various coatings, e.g., to improve a durability.

Polymer materials may further be flexible. Hence, polymer materials may absorb stress, e.g. induced by thermal expansion and/or a thermally induced force, without fracturing. In particular, the polymer material may deform elastically, in other words, bend or flex under stress and then return to an original shape and/or position once the stress is removed.

Hereby, the displacement portions of the lens holder may flex or bend in response to a force, e.g., a thermally induced force. In particular, the displacement portions may bend without breaking and/or without permanently deform the displacement portions or lens holder.

According to a second aspect, there is provided a sensor unit for an image capturing device. The sensor unit has a body extending in a sensor unit plane. The body of the sensor unit is provided with a sensor unit displacement portion configured to be attached to a free end of a support post of a lens holder, and configured to be displaced out of the sensor unit plane in response to a thermally induced force acting on the support post, wherein each sensor unit displacement portion is defined by one or more slits.

The second aspect generally presents the same, or similar, advantages as the first aspect. In particular, features and advantages of the displacement portions of the lens holder may be shared with the sensor unit displacement portions.

Thermal expansion and/or thermally induced forces may deform the sensor unit, e.g. when attached to a lens holder.

The sensor unit, more specifically the sensor unit displacement portions, may be adhesively attached to the free ends of the support posts of the lens holder. Alternatively, the sensor unit may comprise support posts, e.g., corresponding to the support posts of the first aspect.

The sensor unit may comprise an image sensor. The image sensor may be an array of photosensitive elements, such as charge-coupled devices (CCDs) or complementary metal-oxide-semiconductor (CMOS) sensors, integrated on a printed circuit board (PCB). The image sensor may capture light through a lens to form an image. The sensor unit may include additional features such as integrated circuits. The sensor unit may be adapted to acquire images intended to form a video sequence.

According to a third aspect, there is provided an image capturing device comprising: a sensor unit comprising an image sensor; and an optics unit comprising, a lens holder according to the first aspect, and a lens supported by the lens holder. The image capturing device may be a surveillance video camera.

Alternatively, the image capturing device comprises: a sensor unit according to the second aspect comprising an image sensor; and an optics unit comprising, a lens holder and a lens supported by the lens holder. The lens holder having support posts extending from a body of the lens holder along a longitudinal axis perpendicular to the sensor unit plane and configured to support the sensor unit. Each support post having a first end adjoining the body of the lens holder, and a free second end.

The third aspect may generally present the same, or similar, advantages as the first aspect and second aspect.

The displacement portions may allow for a relative movement between the optics unit and the image sensor when a temperature of the environment, of the optics unit, and/or of the image sensor changes. Thereby a focal shift may be counteracted. In particular, the displacement portions may flex along the longitudinal axis, i.e. an optical axis of the image capturing device, such that a distance between the sensor unit and optics unit is kept substantially constant. Specifically, according to the third aspect, a focal shift may be eliminated or at least reduced.

Hereby, compensation for focal shift caused by thermal expansion along the longitudinal axis in image capturing devices is provided. Hence, the displacement portions are capable of maintaining a constant distance (with only μm-scale movement) between the sensor unit and the optics unit, regardless of temperature variations.

The displacement portions of the image capturing device may further overcompensate a displacement if necessary, offering further versatility.

The sensor unit may be coupled to the free second end of each support post of the lens holder. The sensor unit may be adhesively, or via fasteners, coupled to the free second end of each support post. In particular, when the displacement portions are arranged on the sensor unit, the free second end of each support post may be coupled a respective sensor unit displacement portion.

Hereby, the displacement portions of the sensor unit, or the lens holder, may compensate for thermal expansion in all three spatial dimensions.

The compensation for thermal expansion in all three spatial dimensions may be provided by the displacement portions providing flexing along the longitudinal axis, and by the support posts providing flexing radially towards or away from the longitudinal axis, i.e. flexing in the lens holder plane. Thus, ensuring that a performance of the image capturing device remains unaffected by temperature-induced changes. Consequently, resulting in enhanced image quality and imaging reliability.

The support posts of the lens holder may support the sensor unit. Alternatively, the support posts may support the lens holder attached to the sensor unit. In an example, four support posts may be provided for providing a balanced support.

The sensor unit may further comprise a circuit board for processing signals from the image sensor.

In other words, the sensor unit may include an integrated electronic system that interprets and converts captured raw data captured by the image sensor into another format.

The circuit board for processing signals may, e.g., be a PCB. The PCB may allow for compact integration of circuitry with the image sensor.

The lens may be configured to focus a light onto the image sensor. In other words, the lens may channel and/or direct incoming light onto a surface of the image sensor.

The sensor unit may have a first coefficient for thermal expansion, and the lens holder may have a second coefficient for thermal expansion.

In other words, the sensor unit may have a first CLTE and the lens holder may have a second CLTE. In particular, the first CLTE may be smaller than the second CLTE. Hence, the displacement portions, and/or support posts, may flex in response to temperature fluctuations, ensuring that the sensor unit, or PCB, is not displaced in relation to the lens of the optics unit. In particular, the difference in CLTEs may cause the support posts to flex radially, and the displacement portions to flex longitudinally.

The sensor unit may, e.g. comprise copper layers, while the lens holder may be made of a polymeric material.

When the sensor unit is attached to the lens holder, each of a material with unique CLTE, thermal changes may induce a stress. For instance, with an increasing temperature and the materials being constrained, a tensile force may be exerted, potentially leading to displacement or misalignment. Similarly, lower temperatures may create compressive stress, encouraging displacement in an opposite direction.

Hence, at low temperatures, e.g. below room temperature or below −20 °C, the lens holder may contract more than the sensor unit (especially more than the PCB), causing the support posts to flex radially inwards towards the longitudinal axis of the lens holder, and causing the displacement portions to flex out of the lens holder plane towards the sensor unit.

Conversely, at high temperatures, e.g. above room temperature or above 50 °C, the lens holder may expand more than the sensor unit. Thus, the support posts may flex outward from the longitudinal axis of the lens holder, and the displacement portions may flex out of the lens holder plane away from the sensor unit.

The displacement portions of the body of the lens holder, or of the sensor unit, may enable a relative movement of the optics unit and sensor unit in a direction along the longitudinal axis to counteract a focal shift caused by a difference between the first and second coefficients for thermal expansion.

In other words, the relative movement may compensate for the difference in thermal expansion of the materials of the sensor unit and the optics unit.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
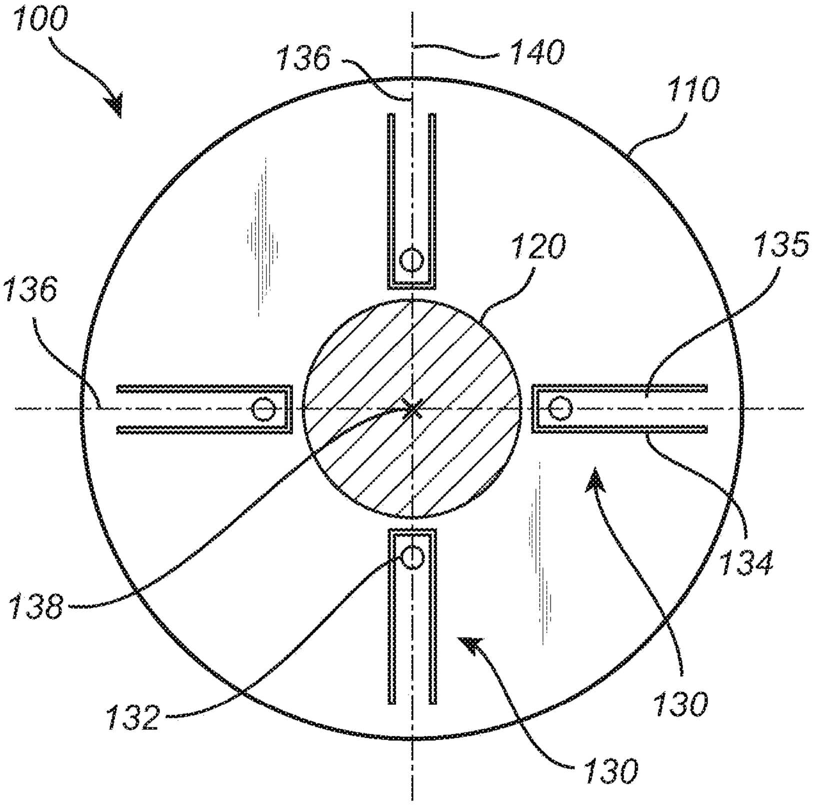
FIG. 1 is a bottom-view of a lens holder comprising displacement portions and support posts.
Figure 6:
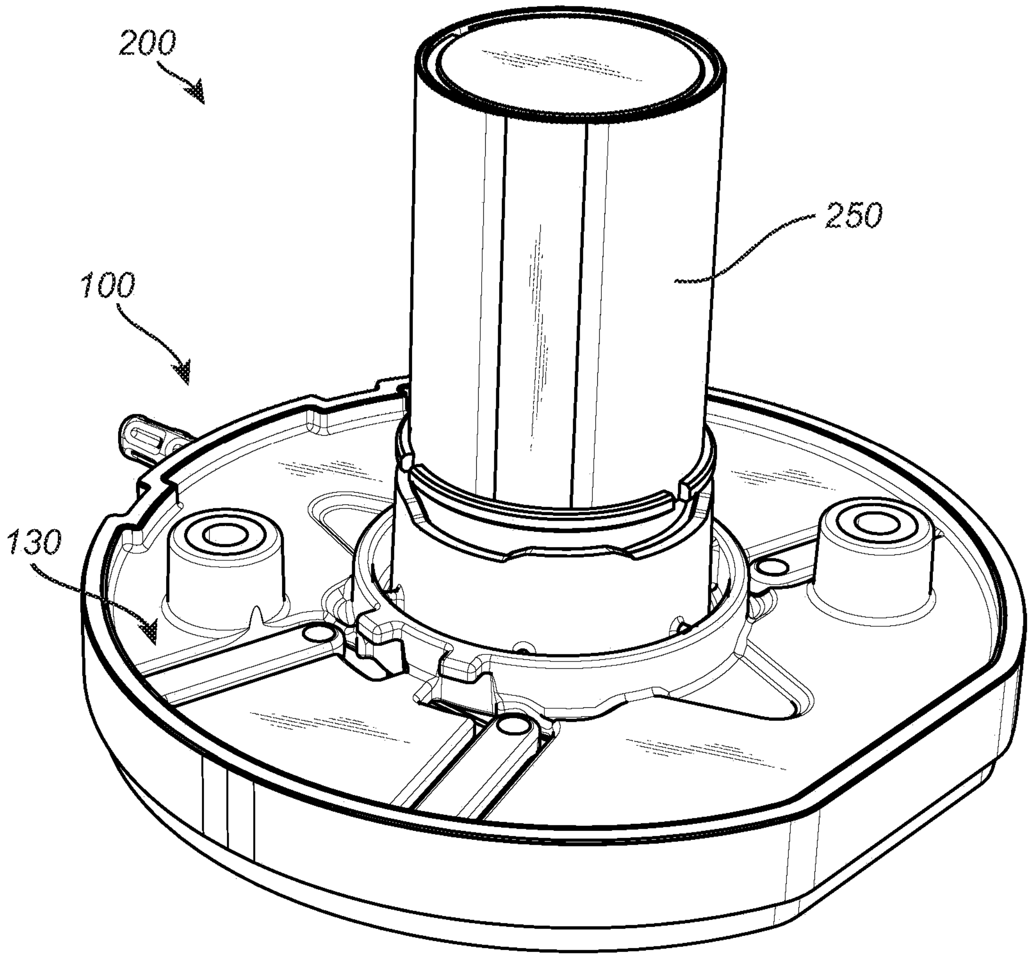
FIG. 6 schematically illustrates an image capturing device comprising a lens.

FIG. 1 illustrates a lens holder 100 for an optics unit of an image capturing device (see FIG. 6). The lens holder 100 has a body 110, e.g., of a polymer material, extending in a lens holder plane.

In FIG. 1, the lens holder 100 comprises a lens mount 120 arranged on the body 110. The lens mount 120 is configured to support a lens of the optics unit, and support posts 132 are configured to support a sensor unit aligned with the optics unit. The support posts 132 are here distributed along a periphery portion of the lens mount 120.

More specifically, the support posts 132 are arranged on displacement portions 130. In particular, an end of each displacement portion 130 is provided with a support post 132. However, one or more support posts 132 may be arranged on the displacement portions 130.

Each displacement portion 130 is defined by a single U-shaped slit 134 forming a tongue 135 with a linear extension along an extension axis 136. However, the slit 134 and the displacement portion 130 may take any suitable shape. For example, the slits may define curved or arced tongues. Hereby, it would be possible to increase the length of each tongue without increasing the radial extension of the displacement portion. Consequently, displacement portions having curved or arced tongues may facilitate accommodation of relatively large thermally induced movements in a lens holder having a relatively compact design.

The slit 134 allows the displacement portions 130 to be displaced out of the lens holder plane. In other words, the displacement portions 130 may be configured to move or flex in a direction orthogonal to the lens holder plane.

The extension axes 136 have a common intersection point 138. Here, the intersection point 138 is located within a region defined by the periphery portion of the lens mount 120, specifically, at a center of the lens holder 100. However, it is appreciated the common intersection point 138 may be anywhere within the lens holder plane. The intersection point 138 may, e.g., be near the periphery portion of the lens mount 120.

In FIG. 1, any extension axis 136 may represent a central axis 140 of the lens holder 100. The central axis 140 of the lens holder 100 may be any axis in the lens holder plane intersecting a center point of the lens holder 100. Here, the center point of the lens holder 100 coincides with the intersection point 138.

The lens holder 100 may, e.g., be 60-90 mm wide whereas the displacement portions 130 (i.e. tongues 135) may be 10-20 mm long, and the support posts may have a length of 1-10 mm. The lens holder may be about 75 mm wide, the displacement portions about 15 mm long, and the support posts about 5 mm long.

Figure 2:
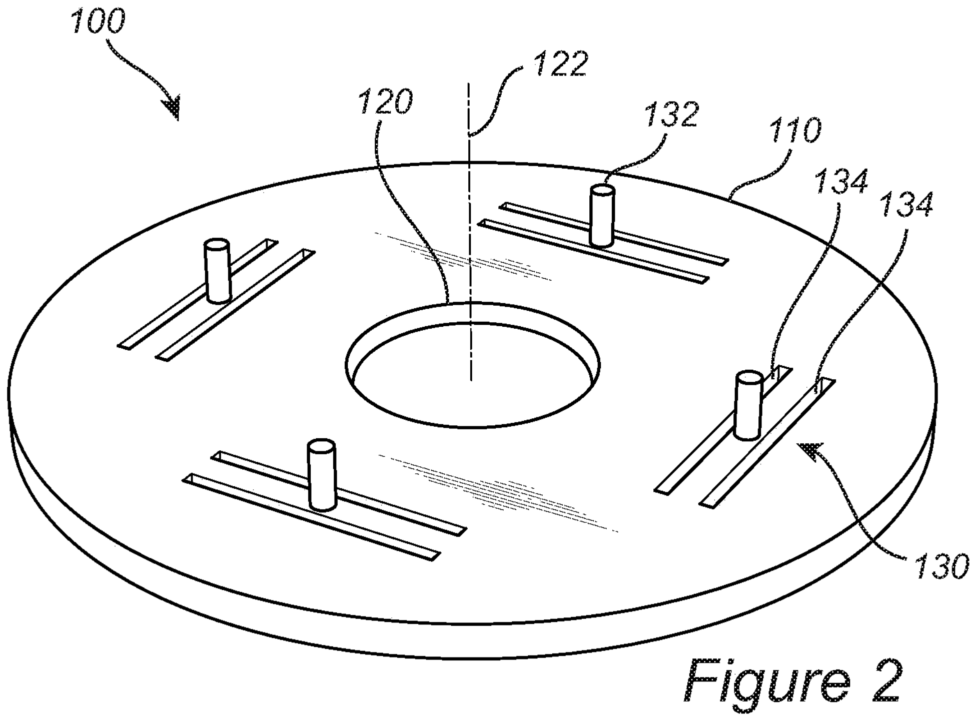
FIG. 2 is a perspective view of a lens holder comprising alternative displacement portions and support posts.

FIG. 2 shows a similar lens holder 100 as described in relation to FIG. 1, however, the lens holder 100 here comprises alternative displacement portions 130.

Each displacement portion 130 is defined by two slits 134. However, it is appreciated that one or more slits 134 may define one or more displacement portions 134. A plurality of slits 134 may, e.g., form a perforation configured to break in response to a thermally induced force, defining a displacement portion 130.

FIG. 2 further shows a first end of each support post 132 adjoining a respective displacement portion 130 at a center portion of each displacement portion 132. However, one or more support posts 132 may join a respective displacement portion 130 at any suitable location.

The support posts 132 extend from the body 110 of the lens holder 100 along a longitudinal axis 122. Specifically, the support posts 132 protrude from the displacement portions 130. In particular, a first end of each support post 132 adjoins the body 110 of the lens holder 100, and a second end of each support post 132 is a free second end.

The displacement portions 130 are configured to be displaced in response to a thermally induced force acting on the support post 132 when the support posts 132 are fixed in their respective free ends. The displacement portions 130 may, e.g., rotate and/or be displaced out of the lens holder plane.

Figure 3A:
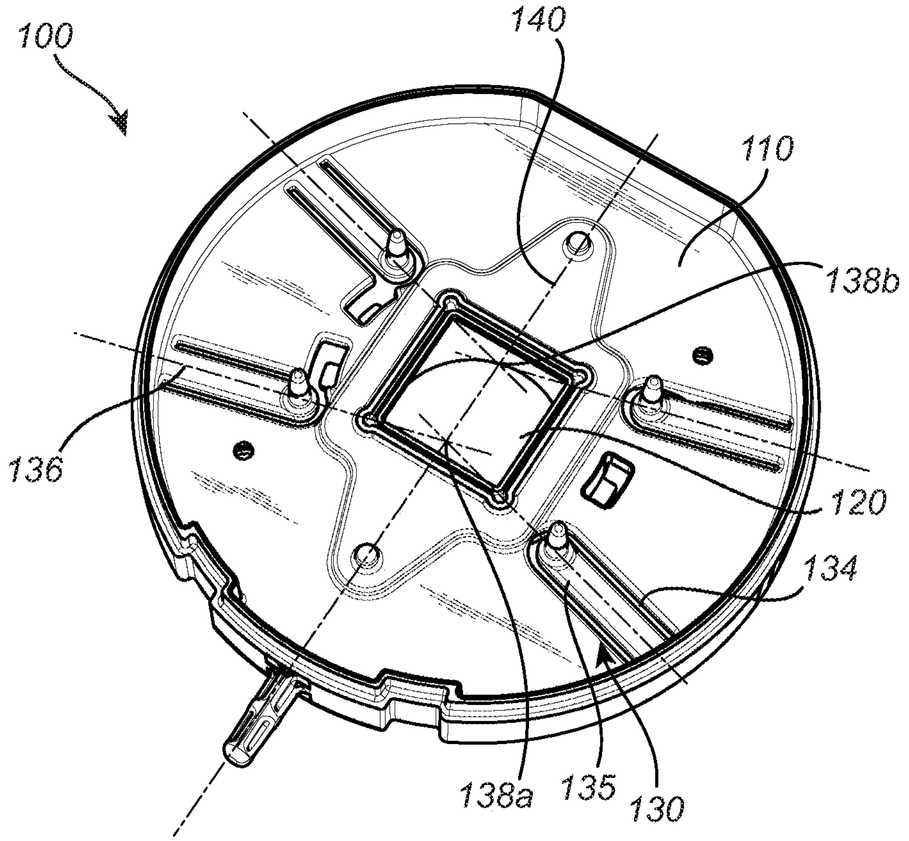
FIG. 3A is a perspective view of an alternative lens holder comprising displacement portions and support posts.

In FIG. 3A, a similar lens holder 100 as in FIG. 1 is shown.

The lens holder 100 here has four displacement portions 130 (forming tongues 135) each having a corresponding extension axis 136. The extension axes 136 pairwise intersect a central axis 140 at common intersection points 138*a*, 138*b*. In particular, the extension axes 136 of a first and second displacement portion 130 intersect the central axis 140 at a first intersection point 138*a*, and the extension axes 136 of a third and fourth displacement portion 130 intersect the central axis at a second intersection point 138*b*. The first and second intersections points 138*a*, 138*b* are here located within a region defined by the periphery portion of the lens mount 120, however, the intersection point 138*a*, 138*b* may be located anywhere within a region defined by a periphery portion of the lens holder 100.

The displacement portions 130 are in this embodiment arranged with symmetry around the central axis 140. Specifically, the displacement portions 130 are here also arranged with symmetry around a second central axis orthogonal to the central axis 140 and in the lens holder plane.

Figure 3B:
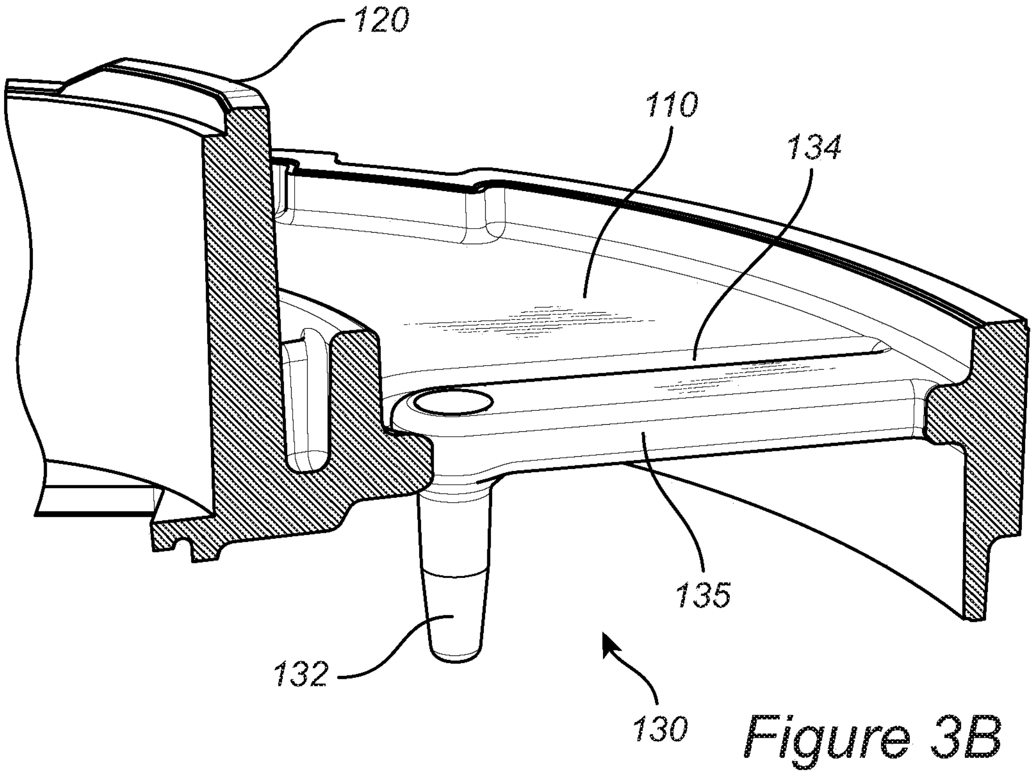
FIG. 3B schematically illustrates a displacement portion forming a tongue.

FIG. 3B shows one of the displacement portions 130, e.g. a displacement portion 130 of FIG. 3A.

The displacement portion 130 is defined by a slit 134 forming a tongue 135. At the end of the tongue 135, a support post 132 is arranged. The support post 132 adjoins the tongue 135 at an orthogonal angle, however, the support post 132 may adjoin to the tongue 135 at any suitable angle. The tongue 135 and the support post 132 are integrally formed with the body 110 of the lens holder. However, alternatively, the support post 132 may, e.g., be attached or coupled to the body 110.

The tongue 135 extends in a direction towards the lens mount 120, whereas the support post 132 extends away from the lens holder body 110, in a direction opposite to the extension of the lens mount 120.

Figure 4A:
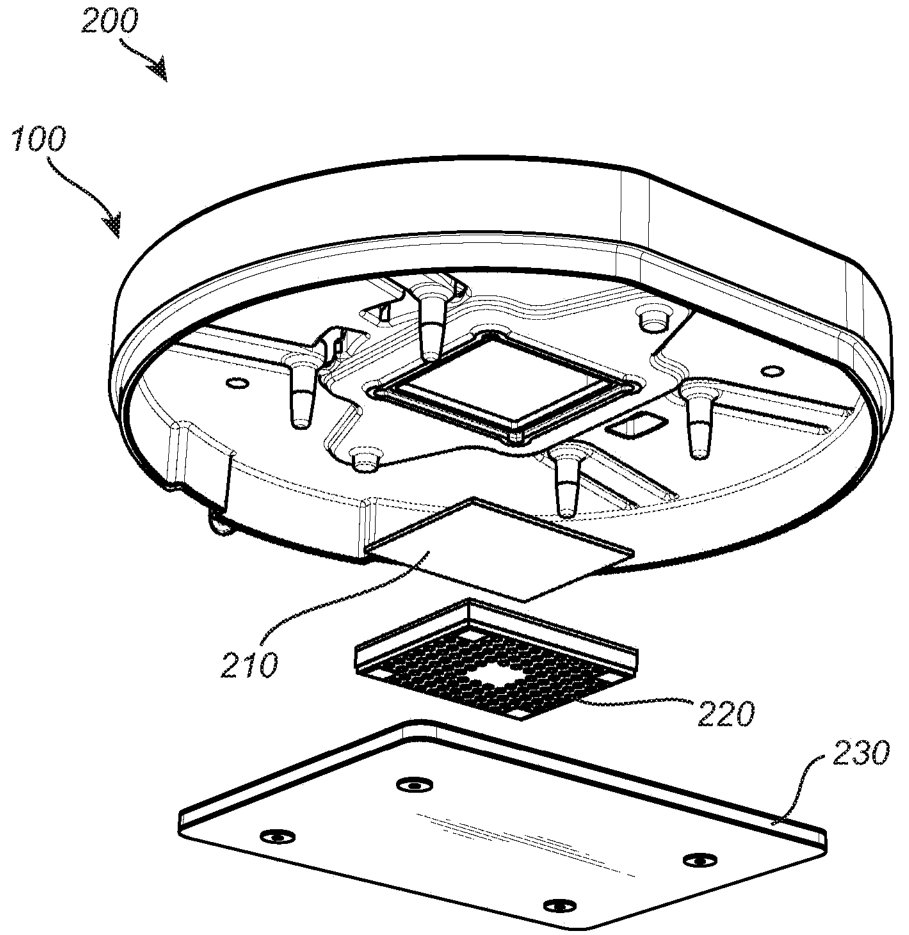
FIG. 4A is an exploded view of an image capturing device.
Figure 4B:
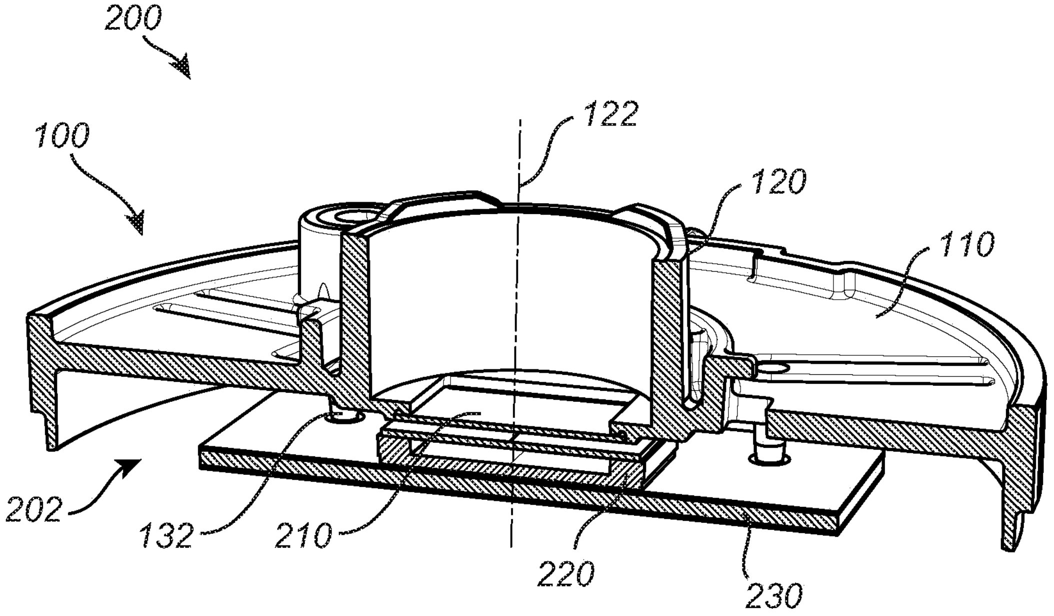
FIG. 4B schematically illustrates a cross-section of an image capturing device.

FIGS. 4A and 4B illustrate an image capturing device. FIG. 4A is an exploded view of the image capturing device 200 and FIG. 4B shows a cross-section of an image capturing device 200.

The image capturing device 200 comprises a sensor unit 202 comprising a circuit board 230 and an image sensor 220 with an optional filter component 210. The image capturing device 200 further comprises an optics unit that has a lens holder 100, e.g. according to any of FIGS. 1-3.

The filter component 210 may be an IR filter, e.g. of glass, for the image sensor 220. The circuit board 230 may be a PCB.

The lens mount 120 extends along a longitudinal axis 122 perpendicular an extension of the lens holder body 110 (i.e. perpendicular to the lens holder plane). The longitudinal axis 122 may coincide with an optical axis of the image capturing device 200.

In FIG. 4B, the sensor unit 202 is coupled to a free second end of each support post 132 of the lens holder 100. Specifically, the support posts 132 of the lens holder 130 are coupled to the circuit board 230. The support posts 132 are coupled to the sensor unit 202 at an orthogonal angle, however, the support posts 132 may be coupled to the sensor unit 202 in any suitable angle.

The support posts 132 may, e.g., be coupled to the sensor unit 202 by glue and/or light curing adhesive such as UV glue.

Although not shown, it is appreciated that the displacement portions according to any of FIGS. 1-4 may be implemented in a sensor unit, e.g. in a circuit board of a sensor unit for an image capturing device. In particular, the sensor unit may have a body extending in a sensor unit plane, where the body is provided with a sensor unit displacement portion configured to be attached to a free end of a support post of a lens holder. The sensor unit displacement portion may further be configured to be displaced out of the sensor unit plane in response to a thermally induced force acting on the support post.

Such a sensor unit may, e.g., be implemented in an image capturing device comprising a lens and a lens holder having support posts extending from a body of the lens holder along a longitudinal axis perpendicular to the sensor unit plane and configured to support the sensor unit. Each support post may have a first end adjoining the body of the lens holder, and a free second end.

Figure 5A:
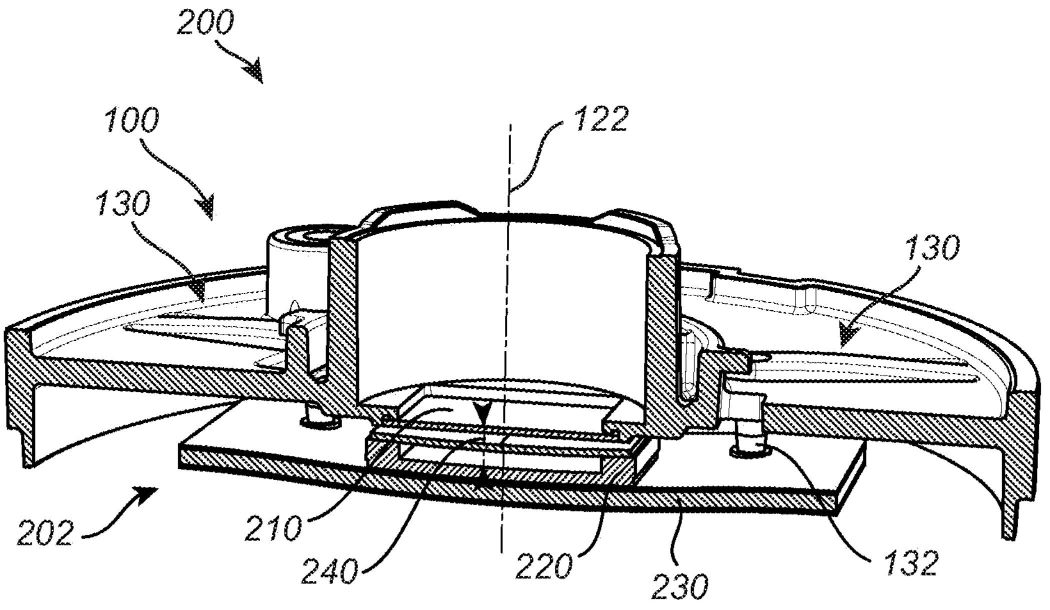
FIG. 5A schematically illustrates a cross-section of an image capturing device in a warm environment.
Figure 5B:
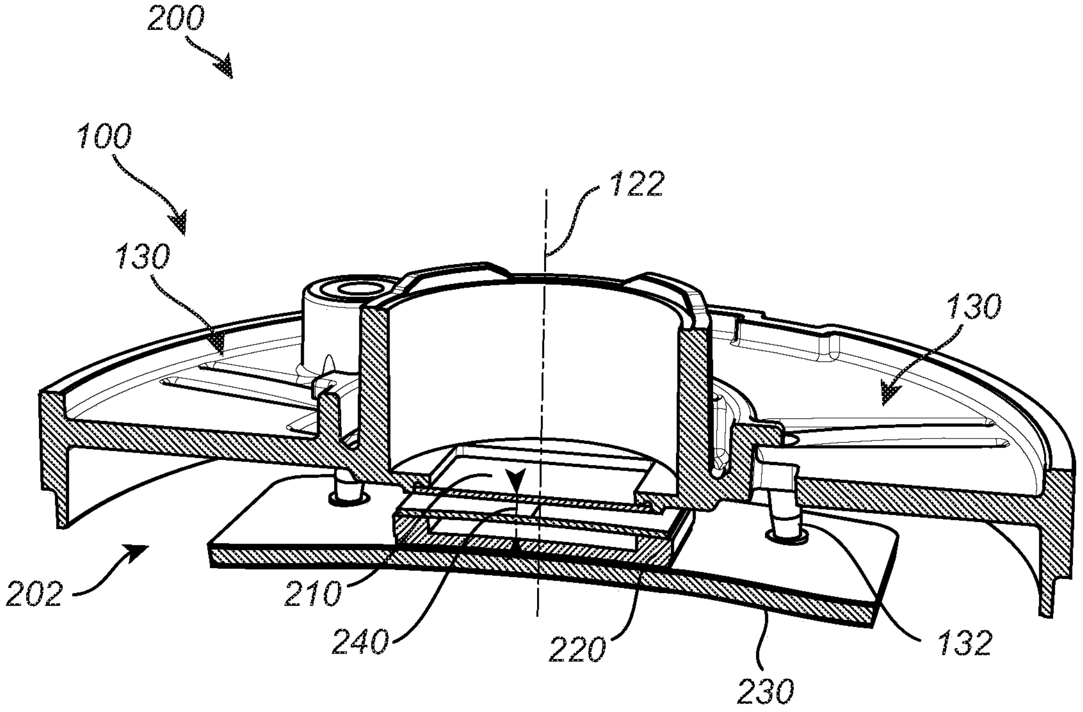
FIG. 5B schematically illustrates a cross-section of an image capturing device in a cold environment.

FIGS. 5A-B are cross-sectional views of image capturing devices 200. Here, the sensor unit 202 has a first coefficient for thermal expansion (i.e. a first CLTE), and the lens holder 100 has a second coefficient for thermal expansion (i.e. a second CLTE). The image sensor 220 and circuit board 230 of the sensor unit 202 further have different CLTEs.

The displacement portions 130 of the lens holder 100, enable a relative movement of the lens holder 100 and the sensor unit 202 in a direction along the longitudinal axis 122 to counteract a focal shift caused by a difference between the first and second coefficients for thermal expansion resulting in different levels of material change (expansion or contraction) when the temperature of the materials changes.

In particular, a distance 240 between the lens holder 100 and the image sensor 220 of the sensor unit 202 is kept substantially constant. Specifically, the change in the distance 240 between the lens holder 100 and the image sensor 220 may be smaller than 10 μm, e.g. 0 μm.

In other words, the distance 240 between the lens holder 100 and the image sensor 220 is an incremental distance (i.e. focal shift) in a direction along the longitudinal axis 122. The distance 240 may more specifically be a distance between the image sensor 220 and a lens arranged in the lens holder 100, e.g., a lens arranged closest to the image sensor 220.

In FIG. 5A, the image capturing device 200 is exposed to a warm environment, e.g. above room temperature and/or above a temperature the image capturing device 200 is calibrated for.

The sensor unit 202 flexes due to thermal expansion of the sensor unit material, and the circuit board 230 bulges away from the lens holder 100 (deformations are magnified for illustrative purpose). Specifically, the image sensor 220, attached to the circuit board 230, causes the circuit board 230 to bend due to different CLTEs of the image sensor 220 and the circuit board 230. Also, the lens holder 100 expands more than the circuit board 230 during heating due to their different CLTEs.

Thus, a bending of the support posts 132 and the displacement portions 130 are created. In particular, the lens holder 100 inherently tends to move away from the sensor unit 202 during heating. However, bending is substantially counteracted or neutralized by the displacement portions 130 being displaced out of the lens holder plane, in a direction away from the sensor unit 202.

In FIG. 5A, the support posts 132 extend in a direction parallel to the longitudinal axis 122. However, in a warm environment, the support posts 132 may bend such that the end of the support posts 132 adjoining the displacement portions 130 are further away from a center of the lens holder 100 than the end of the support posts 132 coupled to the sensor unit 202.

In FIG. 5B, an image capturing device 200 is exposed to cold environment, e.g. below room temperature and/or below a temperature the image capturing device 200 is calibrated for.

The sensor unit 202 flexes due to thermal contraction of the sensor unit material, and the circuit board 230 bulges toward the lens holder 100 (deformations are magnified for illustrative purpose). In particular, the lens holder 100 contracts more than the circuit board 230 during cooling due to their different CLTEs.

The lens holder 100 inherently tends to move towards the sensor unit 202 during cooling. However, bending is substantially counteracted or neutralized by the displacement portions 130 being displaced out of the lens holder plane, in a direction towards the sensor unit 202.

In FIG. 5B, the support posts 132 are bent such that the end of the support posts 132 adjoining the displacement portions 130 is closer to a center of the lens holder 100 than the end of the support posts 132 coupled to the sensor unit 202.

FIG. 6 shows an image capturing device 200 according to, e.g., FIGS. 4-5 further comprising a lens barrel 250 supported by the lens holder 100.

The lens barrel 250 is configured to focus a light onto the image sensor 220 (not shown). The lens barrel 250 may comprise a one or more lenses, e.g., flat, convex, and/or concave lenses.

The displacement portions 130 may be displaced such that a distance 240 between the image sensor 220 and the lens barrel 250 is substantially constant during exposure to temperature variations.

It will be appreciated that the present invention is not limited to the embodiments shown. Several modifications and variations are thus conceivable within the scope of the invention which thus is exclusively defined by the appended claims.

The invention claimed is:

1. A lens holder for an optics unit of an image capturing device, the lens holder having a body extending in a lens holder plane and comprising:

a lens mount arranged on the body configured to support a lens of the optics unit and extending along a longitudinal axis perpendicular to the lens holder plane; and support posts each having an extension so as to protrude from the body of the lens holder in a direction parallel with the longitudinal axis and configured to support a sensor unit aligned with the optics unit, wherein each support post has a first end adjoining the body of the lens holder, and a free second end, and wherein the first end of one or more support posts adjoins a respective displacement portion of the body of the lens holder, which displacement portion extends in said lens holder plane and is configured to be displaced out of the lens holder plane in response to a thermally induced force acting on the support post, and wherein each displacement portion is defined by one or more slits.

2. The lens holder according to claim 1, wherein each displacement portion is defined by a single slit forming a tongue.

3. The lens holder according to claim 2, wherein the tongues have a linear extension.

4. The lens holder according to claim 2, wherein the tongues comprise at least two or more tongues extending along a respective extension axis, and wherein the extension axes, at a common intersection point, intersects a central axis of a region defined by the periphery portion of the lens mount.

5. The lens holder according to claim 1, wherein each support post is integrally formed with the body of the lens holder.

6. The lens holder according to claim 1, wherein the support posts are distributed along a periphery portion of the lens mount.

7. The lens holder according to claim 1, wherein the lens holder is formed of a polymer material.

8. A sensor unit for an image capturing device, the sensor unit having a body extending in a sensor unit plane, wherein the body is provided with a sensor unit displacement portion configured to be attached to a free end of a support post of a lens holder, and configured to be displaced out of the sensor unit plane in response to a thermally induced force acting on the support post, wherein each sensor unit displacement portion is defined by one or more slits.

9. An image capturing device comprising:

a sensor unit comprising an image sensor; and an optics unit comprising, a lens holder for the optics unit, the lens holder having a body extending in a lens holder plane and comprising:

a lens mount arranged on the body configured to support a lens of the optics unit and extending along a longitudinal axis perpendicular to the lens holder plane; and support posts each having an extension so as to protrude from the body of the lens holder in a direction parallel with the longitudinal axis and configured to support a sensor unit aligned with the optics unit, wherein each support post has a first end adjoining the body of the lens holder, and a free second end, and wherein the first end of one or more support posts adjoins a respective displacement portion of the body of the lens holder, which displacement portion extends in said lens holder plane and is configured to be displaced out of the lens holder plane in response to a thermally induced force acting on the support post, and wherein each displacement portion is defined by one or more slits, and a lens supported by the lens holder;

or a sensor unit comprising an image sensor and an optics unit the sensor unit having a body extending in a sensor unit plane, wherein the body is provided with a sensor unit displacement portion configured to be attached to a free end of a support post of a lens holder, and configured to be displaced out of the sensor unit plane in response to a thermally induced force acting on the support post, wherein each sensor unit displacement portion is defined by one or more slits, a lens holder having support posts extending from a body of the lens holder along a longitudinal axis perpendicular to the sensor unit plane and configured to support the sensor unit, each support post having a first end adjoining the body of the lens holder, and a free second end, and a lens supported by the lens holder.

10. The image capturing device according to claim 9, wherein the sensor unit is coupled to the free second end of each support post of the lens holder.

11. The image capturing device according to claim 9, wherein the sensor unit further comprises a circuit board for processing signals from the image sensor.

12. The image capturing device according to claim 9, wherein the lens is configured to focus a light onto the image sensor.

13. The image capturing device according to claim 9, wherein the sensor unit has a first coefficient for thermal expansion, and the lens holder has a second coefficient for thermal expansion.

14. The image capturing device according to claim 13, wherein the displacement portions of the body of the lens holder, or of the sensor unit, enable a relative movement of the optics unit and sensor unit in a direction along the longitudinal axis to counteract a focal shift caused by a difference between the first and second coefficients for thermal expansion.

* * * * *